Oct. 31, 1950 A. M. KASNOWICH 2,527,936

RECORD CHANGER

Filed Jan. 17, 1947 8 Sheets-Sheet 1

INVENTOR.

Anthony M. Kasnowich

By Clarence J. Loftus atty.

Oct. 31, 1950 | A. M. KASNOWICH | 2,527,936

RECORD CHANGER

Filed Jan. 17, 1947 | 8 Sheets-Sheet 2

INVENTOR.
Anthony M. Kasnowich

By Clarence J. Loftus
atty.

Oct. 31, 1950 A. M. KASNOWICH 2,527,936

RECORD CHANGER

Filed Jan. 17, 1947 8 Sheets-Sheet 3

INVENTOR.

Anthony M. Kasnowich

By Clarence J. Loftus atty

RECORD CHANGER

INVENTOR.

Anthony M Kasnowich

By Clarence J. Loftus atty

Oct. 31, 1950 A. M. KASNOWICH 2,527,936

RECORD CHANGER

Filed Jan. 17, 1947 8 Sheets-Sheet 5

INVENTOR.

Anthony M. Kasnowich

By Clarence J. Loftus Atty

Oct. 31, 1950 A. M. KASNOWICH 2,527,936

RECORD CHANGER

Filed Jan. 17, 1947 8 Sheets-Sheet 6

INVENTOR.

Anthony M. Kasnowich

By Clarence J. Loftus Atty

INVENTOR.
Anthony M. Kasnowich
By Clarence J. Loftus atty.

Oct. 31, 1950 A. M. KASNOWICH 2,527,936

RECORD CHANGER

Filed Jan. 17, 1947 8 Sheets-Sheet 8

INVENTOR.

Anthony M. Kasnowich

By Clarence J. Loftus

Atty

Patented Oct. 31, 1950

2,527,936

UNITED STATES PATENT OFFICE 2,527,936

RECORD CHANGER

Anthony M. Kasnowich, Grand Rapids, Mich., assignor to A M I Incorporated, Chicago, Ill., a corporation of Michigan Application January 17, 1947, Serial No. 722,502

4 Claims. (Cl. 274—10)

Figure 1:
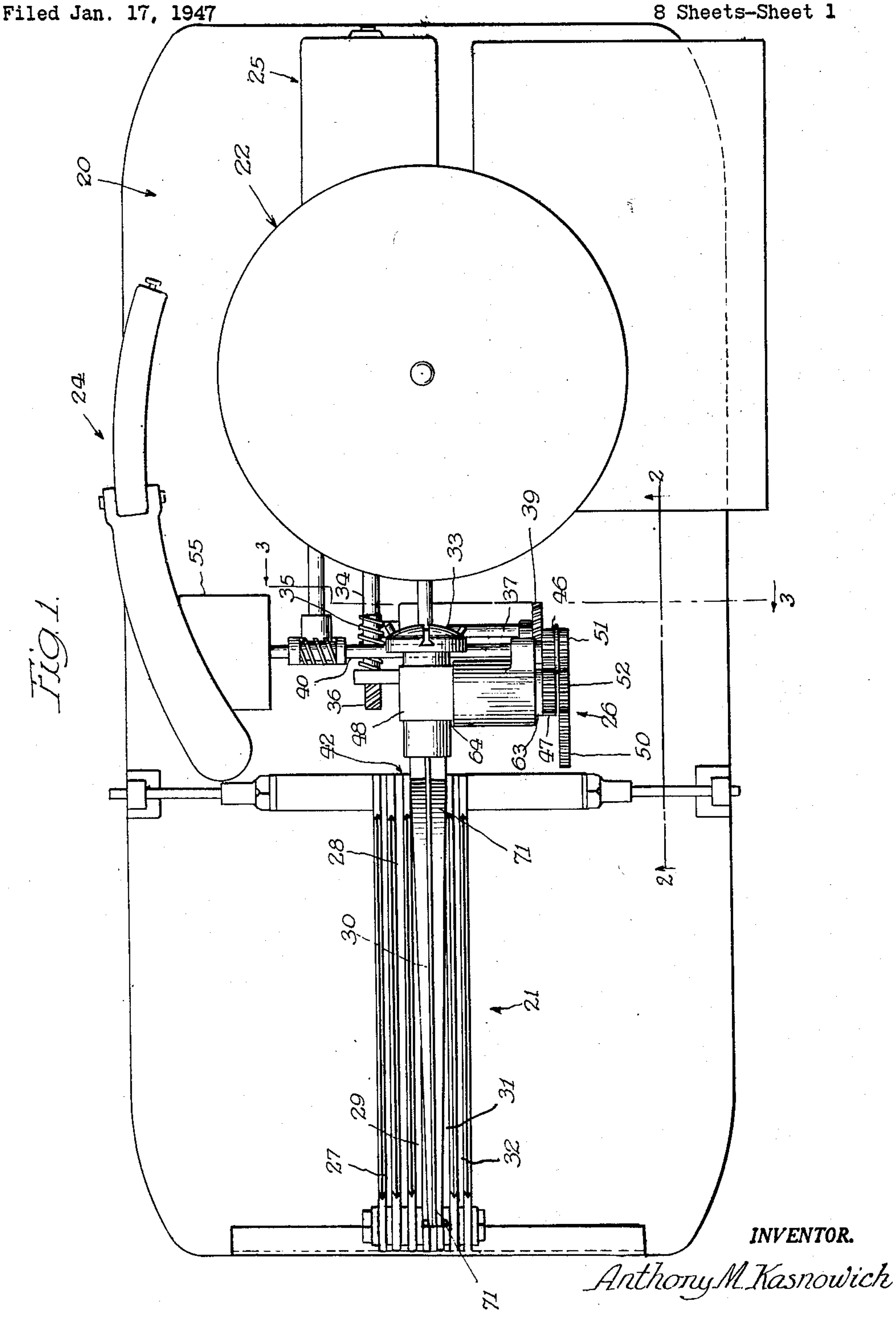

The present invention relates to record changers for phonographs and specifically to an automatic phonograph record changer of the general character disclosed in United States Reissue Patent Number 21,514, reissued July 23, 1940 to the Automatic Instrument Company, assignee of Clifford H. Green, deceased.

An automatic phonograph of the type under consideration is adapted to afford a large number of selections and to play either side of each record. The broad functions of the record changer are to select a given record disc and to take it from a magazine, to lay one side or the other on a playing turntable, to remain idle during record playing, to take the record from the turntable and to return it to the magazine, then to repeat the cycle of operations until the desired program is completed. These functions are performed by the following units:

1. A record rack or magazine in which there are stored a plurality of record discs constituting the available selections;
2. A selector device and associated equipment which responds to the deposit of each coin unit by a customer and/or to a manual selecting operation in such manner as to cause the record magazine to move and to place the selected record in a position where it can be grasped and placed on the phonograph turntable, this position being hereinafter referred to as the "transfer position";
3. A transfer mechanism and gripper assembly for gripping the selected record upon its attainment of the transfer position and placing it on the phonograph turntable, this mechanism also being operable to return the record to the magazine upon the completion of its play. These two phases of operation are hereinafter referred to as the "delivery phase" and the "return phase";
4. A motor for driving the record rack and the transfer mechanism;
5. A control mechanism for moving the record magazine when a selection is made and for stopping the magazine when the selected record disc reaches the transfer position;
6. Means for causing the transfer mechanism to be driven in one direction during the record delivery phase;
7. Means for causing the transfer mechanism to be driven in the reverse direction during the record return phase;
8. A phonograph proper, consisting of a tone arm and a turntable for playing the record so selected, transferred and delivered; and
9. A turntable driving motor.

The broad object of the present invention is to provide an improved, simplified record changer structure, particularly in the transfer mechanism and record gripping assembly and in the mechanism for so controlling the transfer mechanism as to cause the desired side of a record disc to be played. Ancillary objectives under this broad object are to reduce the number of parts, to cut down manufacturing costs and to provide a record changer of maximum reliability and durability.

An additional object of the invention is to provide a simplified and improved transfer and gripper mechanism for assuring a firm grasp on each record disc before it is transported.

Another broad object of the invention is to provide an improved mechanism for causing the gripper assembly to turn in one direction or the other during transportation of the record between magazine and turntable, thus to determine which side of a record disc will be played.

The automatic record changer herein disclosed is similar in its broad general aspects to that disclosed in the above-mentioned reissue patent to Green. It departs from the Green structure primarily in the arrangement of the transfer mechanism and in the arrangement of the mechanism for causing one side or the other of a record disc to be played.

Other objects, advantages and capabilities of the invention will become apparent from the following description of the accompanying drawings, in which there is fully disclosed one illustrative embodiment of my invention.

Figure 2:
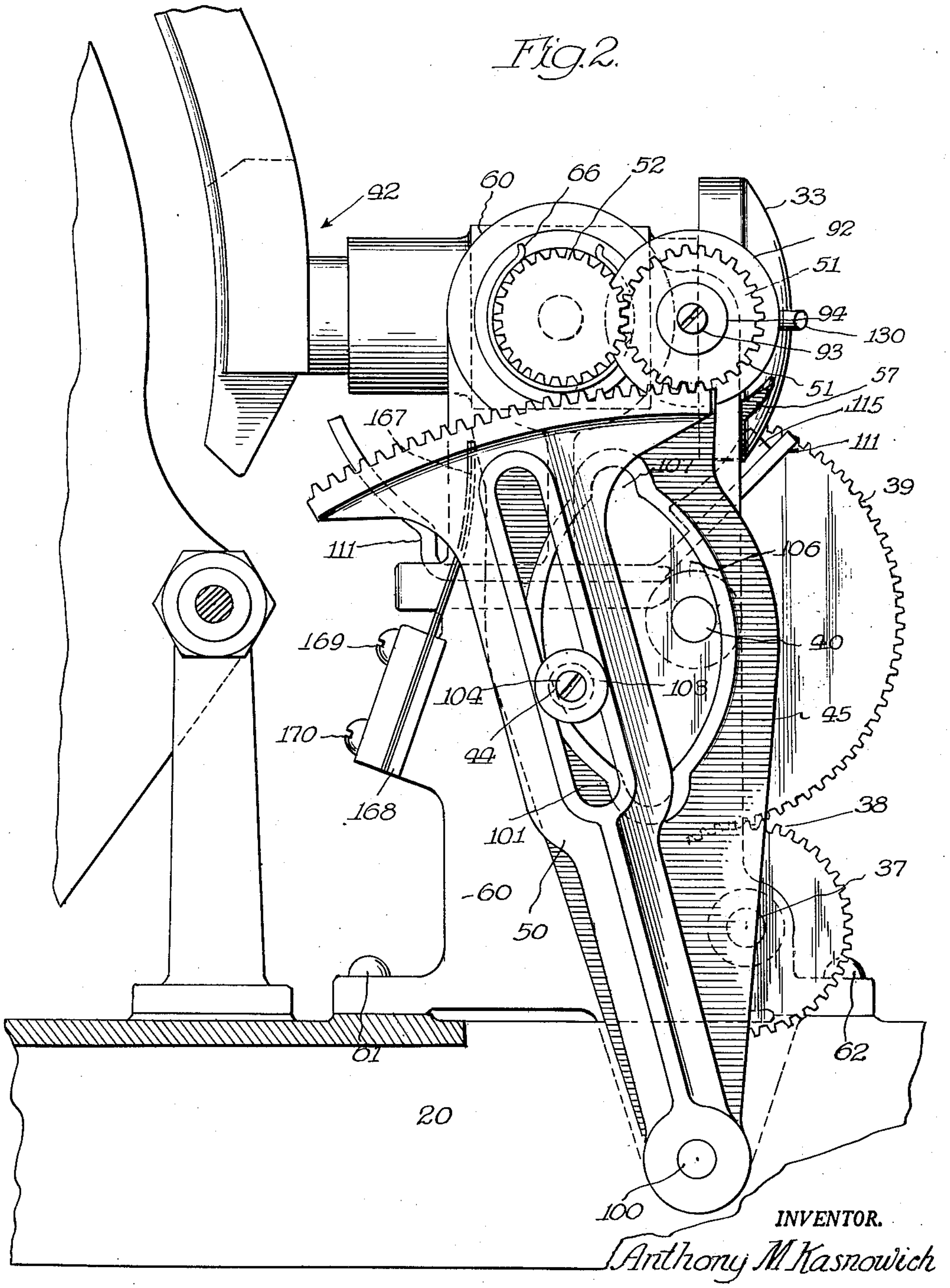
Figure 3:
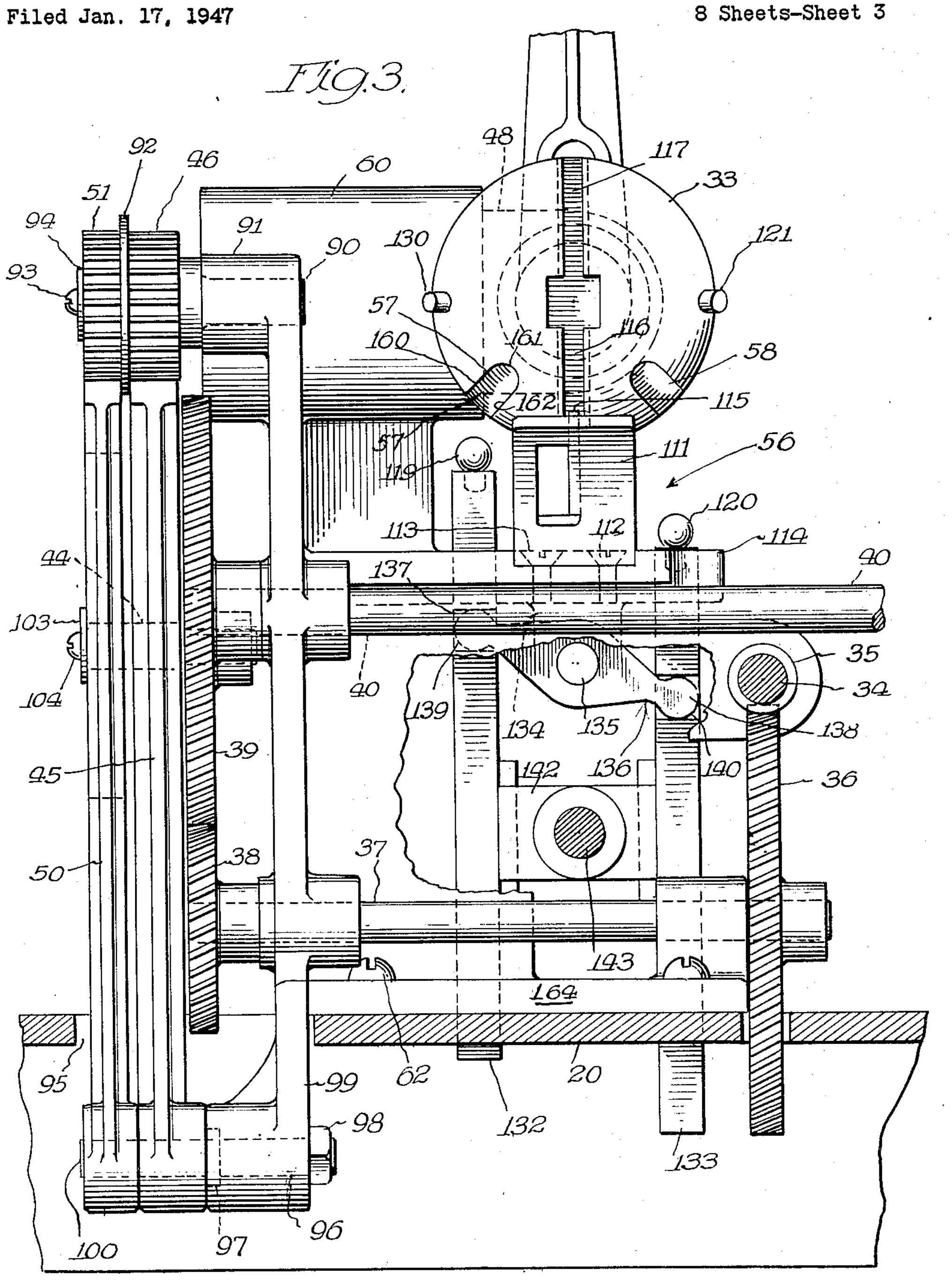
Figures 4, 5, 6, 15:
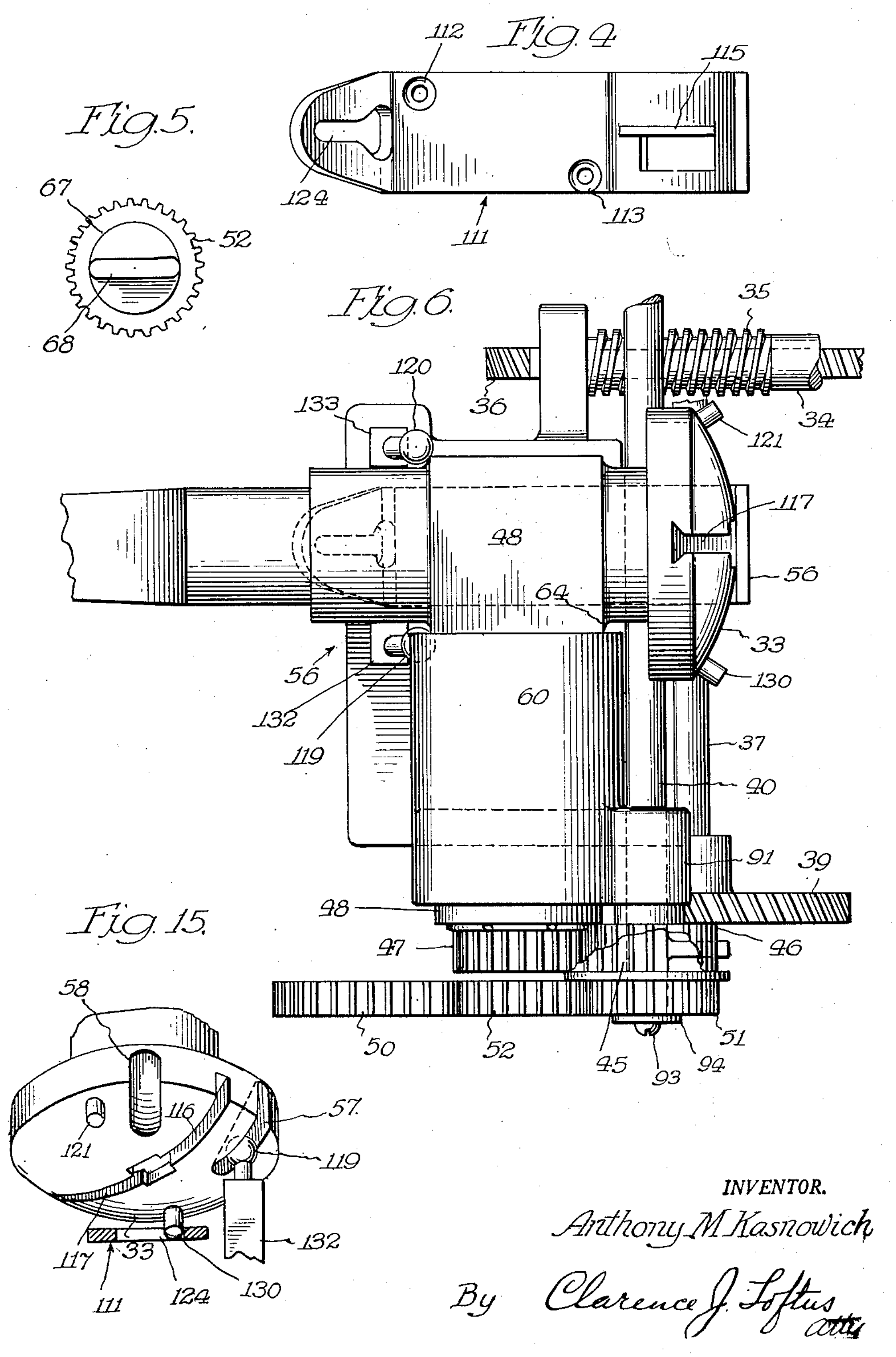
Figure 8:
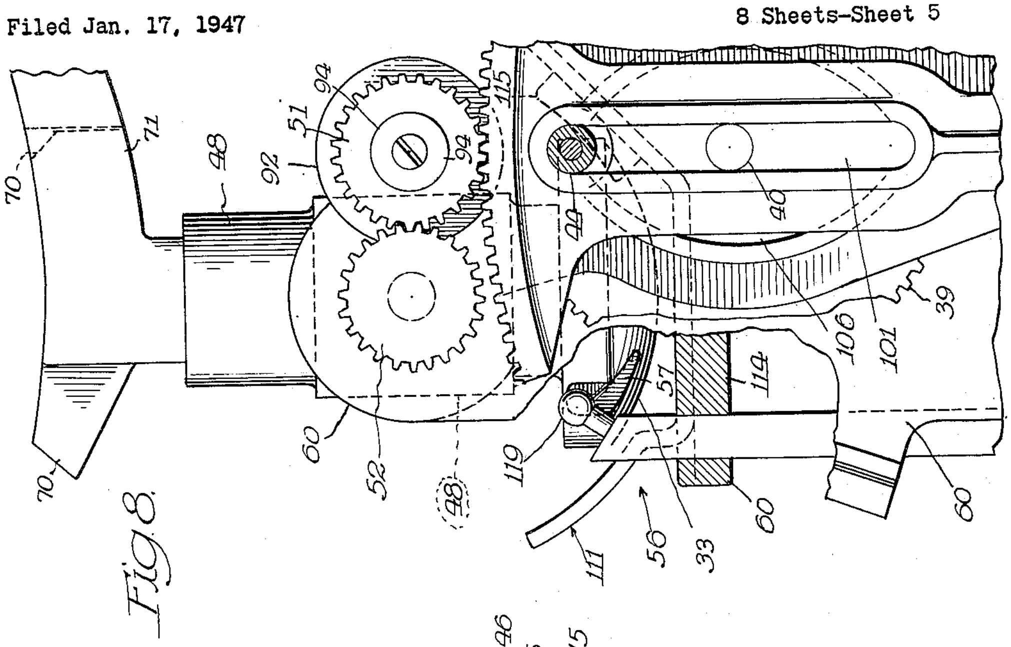
Figures 13, 14:
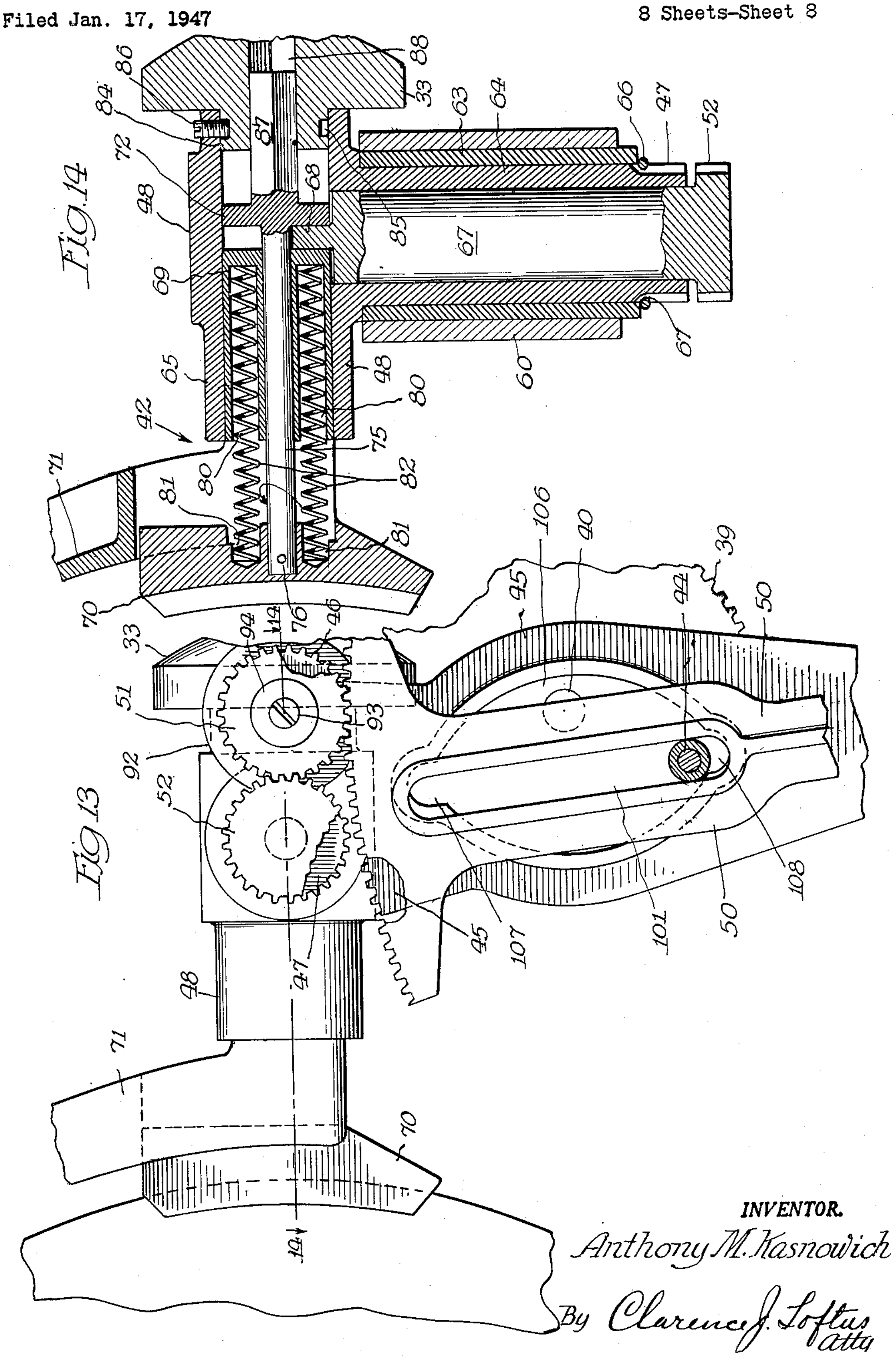

In the drawings; Fig. 1 is a top plan view showing a complete automatic phonograph changer embodying a preferred form of the invention; Fig. 2 is a front elevational sectional view of the transfer mechanism included in the Fig. 1 embodiment as taken on line 2—2 of Fig. 1 and looking in the direction of the arrows, showing the conditions which exist before a record disc is grasped and transferrered from the record magazine to the turntable, and after a record disc has been returned and released to the magazine; Fig. 3 is a right end elevational view of the transfer mechanism included in the Fig. 1 embodiment, showing the mechanism provided for determining the side of a record disc to be played, this view being taken on line 3—3 of Fig. 1; Fig. 4 is a top plan view of the guide member which cooperates with elements on the mushroom for stabilizing the mushroom and gripper assembly before and after the phase of record transfer which determines which side of the record will be played; Fig. 5 is a view, taken from the rear, showing the cam for spreading the gripper members and the gear which actuates that cam; Fig. 6 is a top plan view of the novel transfer mechanism provided in accordance with the invention; Figs. 7, 8, 9, 10, 11, 12 and 13 are front elevational views of the transfer mechanism showing, respectively, the positions of its parts during the following phases of its cycle of operation: When a record disc has been grasped but before it begins to be transported from the record magazine to the turntable (Fig. 7), when the record disc has been transported approximately halfway from the magazine to the turntable (Fig. 8), when the record disc has undergone the twisting operation but has not yet been placed on the turntable (Fig. 9), when the record disc has been placed on the turntable but not yet released by the grippers (Fig. 10), when the record disc has been released so that playing is ready to begin (Fig. 11), when record play has been completed and the record disc is again grasped by the gripper mechanism (Fig. 12), and when the record disc has been transported back to the magazine but not yet released (Fig. 13, Fig. 2 showing the last phase of the cycle and the beginning phase of the next cycle); Fig. 14 is a top sectional view of the gripper mechanism, taken on line 14—14 of Fig. 13 and looking in the direction of the arrows (in Fig. 14 the gripper assembly 42 has been rotated through 90° in the direction indicated by the arrow from the position which it normally assumes, under the conditions illustrated in Fig. 13, this convention having been assumed for the purpose of showing clearly the construction of the gripper members 70 and 71, the springs 82, and the gripper actuating member 69; and Fig. 15 is a view of the mushroom 33 showing the interaction of the mushroom 33 and the ball-plunger when the rear side of a record disc is to be played.

Referring first to Fig. 1 the record changer comprises a metallic base 20, a reciprocating record disc magazine 21, a playing turntable 22, a tone arm 24, an electric driving motor 25 and a transfer mechanism 26.

The record discs representing the various selections are placed in the compartments of the magazine 21, six of which are shown and indicated generally at 27, 28, 29, 30, 31, 32 for purposes of illustration. This record changer plays both sides of each disc, so that twelve selections would be available in the illustrative embodiment shown. It will be understood that in commerical practice a larger number of selections is made available, forty for example. When a selection is made, motor 25 drives the record magazine forwardly and/or rearwardly with a reciprocating motion until the selected record disc attains the transfer position (the record in compartment 30 being shown in that position in Fig. 1). When the selected record reaches that position the magazine stops. If the record magazine is arrested from a forward motion, the front side of that record disc is played. If the magazine is arrested from a rearward motion, the the rear side of the record is played. The selector or means by which the selection is made, the shafts and gearing by which motor 25 drives magazine 21, and the clutches and controls by which motor 25 and magazine 21 are coupled when a selection is made and uncoupled when the selected record reaches the transfer position are not herein shown for the reason that they are fully disclosed in the aforementioned Green reissue patent and are therefore well known to those skilled in the art.

When the selected record reaches the transfer position it is grasped by the transfer mechanism 26 and placed on the turntable 22 with the proper side up, so that the desired selection is played. Motor 25 also drives the transfer mechanism. A motion train between the transfer mechanism 26 and the tone arm 24 causes the tone arm to be placed in playing position as the selected record disc is laid on the turntable and to be lifted off the turntable as the record is returned to the magazine.

When the record has been played motor 25 again drives the transfer mechanism and causes the tone arm 24 to be lifted off of the record disc and the record disc to be returned to the turntable. The means for coupling motor 25 to the transfer mechanism when the record disc attains the transfer position, the control means for actuating the coupling means, the means for coupling the motor to the transfer mechanism after record play is completed, and the control means for actuating the last-mentioned means, as well as the means for causing the transfer mechanism to stop at the end of the record delivery and record return phases, and the motion train between the transfer mechanism 26 and the tone arm 24 need not be here shown or described, for the reason that they are fully disclosed in the aforementioned Green patent and/or in my copending application Serial No. 668,682, filed in the United States Patent Office on May 10, 1946, entitled "Automatic Phonograph" and assigned to the assignee of the present application and invention.

My invention resides in improvements in the transfer and gripper actuating mechanism 26, and in the mechanism for causing the mushroom 33 (Fig. 1) to twist the record in one direction or another during transportation between the magazine and turntable as well as in various combinations of my novel mechanisms with other record changer components. Reference is made to the aforesaid Green reissue patent and my said copending application for a complete description of those parts of the record changer which need not be herein illustrated or described in detail in disclosing the present invention.

In view of the art to which reference has been made, the detailed disclosure of this invention begins by pointing out that shaft 34 (Fig. 1) turns in a clockwise direction, as seen from the right side, whenever a record disc is to be grasped and moved, whether from the magazine to the turntable or from the turntable to the magazine. Shaft 34 carries a worm 35 which intermeshes with a worm wheel 36 on a shaft 37, driving wheel 36 and shaft 37 in a counterclockwise direction as seen from the front. Shaft 37 carries for rotation a gear 38, accordingly driven in a counterclockwise direction. Gear 38 intermeshes with a gear 39, carried on a shaft 40 (Figs. 2 and 3). Gear 39 rotates in a clockwise direction as seen from the front, whenever a record disc is grasped and moved, whether from the magazine to the turntable or from the turntable to the magazine. The means by which gear 39 is powered at the proper times is fully disclosed in my aforesaid copending application. The above summary description thereof is sufficient for the purposes of disclosing the present invention.

It will be seen that gear 39 roughly corresponds to element 102 of my aforesaid copending application in that it may be regarded as the source of the various motion trains. Shaft 34 is, of course, powered by motor 25 and is coupled or uncoupled to the motor at the proper times for causing record-disc delivery to the turntable and record-disc return to the magazine.

One broad function of gear 39 is to drive the transfer mechanism and to cause mushroom 33 (Fig. 2) and the gripper assembly, generally indicated at 42, to turn clockwise about an axis parallel to shaft 40 when a record disc is transported from the magazine to the turntable (Figs. 1 and 14), and to turn counterclockwise when the disc is returned to the magazine. The motion train for this task begins at gear 39 (Fig. 1) and continues through a pin 44 on gear 39 (Fig. 2), a sector gear 45 (Fig. 3), a gear 46 (Fig. 6) and another gear 47. Pinion gear 47 is secured to a rotatable barrel 48 and this barrel carries the gripper assembly 42. It should be noted that the record disc is transported only when the following conditions are satisfied:

First, gear 39 is turning; second, the gripper assembly 42 has grasped a record disc; third, pin 44 is moving sector gear 45.

Another broad function of gear 39 is to power the gripper assembly to release a record disc. The motion train for this purpose begins at gear 39 and proceeds through pin 44, sector gear 50, gear 51 and gear 52. The immediate function of gear 47 is to turn the gripper assembly about the pivotal bore axis of barrel 48. The function of gear 52 is to actuate the gripper mechanism in such a manner that, before the barrel starts to turn in order to transport a record disc, the record disc is securely gripped, and also in such a manner that, after a record disc has been transported either to the turntable or to the magazine, the gripper assembly will be so actuated as to release the record disc. In short, during any cycle of the operation of the transfer mechanism, gear 52 first turns, then gears 47 and 52 rotate in synchronism, then gear 47 stops while gear 52 continues to rotate and finally gear 52 stops. In accordance with my invention I have provided a novel mechanism comprising gear 39, sector gears 45 and 50, pin 44, and gears 46 and 51 for causing gears 47 and 52 to behave in this manner. In furtherance of this objective, I so dispose gears 46 and 51 that they intermesh with and drive gears 47 and 52 respectively. I also so dispose sector gears 45 and 50 that their teeth intermesh with gears 46 and 51, respectively. Also, in furtherance of this objective, I so form and arrange gears 45 and 50 that gear 50 starts to move before gear 45 does, that gears 50 and 45 next turn together, that gear 45 then stops and that gear 50 continues to turn, finally stopping. In other words, initial rotation of gear 52 relative to gear 47 before rotation of gear 47, subsequent rotation of gears 47 and 52 in synchronism and final rotation of gear 52 alone are effected by initial motion of gear 50, subsequent synchronous rotation of gears 45 and 50 and final motion of gear 45 alone.

Still another broad function of gear 39 is to drive the shaft 40 and the tone arm cam 55 which positions tone arm 24, in a manner fully disclosed in my aforesaid copending patent application and also in my copending patent application, Serial No. 702,479, entitled "Record Changer for Phonograph," filed in the United States Patent Office on October 10, 1946, and assigned to the assignee of the present application and invention.

The side of the record disc to be laid down on the turntable is determined by a guiding mechanism 56 (Fig. 3) which cooperates with grooves 57 and 58 on the mushroom 33 to twist the record disc in one direction or the other about the transverse bore axis of the barrel during transportation. The novel transfer mechanism illustrated in Figs. 2, 3, 5, 7, 8, 9, 10, 11, 12 and 13 assures that the record disc will be firmly gripped before transportation between magazine and turntable and also performs the transporting operation. The mushroom guiding mechanism illustrated in Figs. 3, 4, 6, 8, 9, 10 and 11 has novel features assuring long wear, smooth action and reliability. Particular attention is directed to these features as the detailed description proceeds.

Referring now specifically to Figs. 1, 2, 3, 5, and 14, a transfer head casting 60 is secured to base 20 by screws 61 and 62 (Fig. 2). The top portion of this casting is machined to receive a cylindrical bronze bearing 63 (Fig. 14), the bearing being rigidly fitted and secured to that bore and extending in a front-back direction. Journaled for rotation within that bearing is a concentric hollow cylindrical pivot portion 64 of barrel 48. Barrel 48 has the general shape of a pipe T-joint, and comprises the portion 64 on which it is rotatably mounted and a hollow cylindrical portion 65 defining its transverse bore. Gear 47 is integral with the portion 64, whereby when gear 47 is rotated about an axis concentric with portion 64 the whole barrel 48 rotates relative to that axis to transport a record disc between magazine and turntable. A split-ring lock washer 66 embraces a reduced portion of gear 47 (Figs. 2 and 14).

Integral with gear 52 is a cylindrical shank 67, rotatably mounted within the front-back bore defined by portion 64 of the barrel. The head of shank 67 is formed as a flat cam 68, best shown in Figs. 5 and 14. The function of this cam is to spread the gripper-actuating members 69 and 72 whenever a record disc is to be released. Members 52, 67, and 68 comprise an integral whole and therefore rotate in unison. It will be seen that relative rotation of gear 52 with respect to gear 47 causes cam 68 to turn relative to the gripper-actuating members 69 and 72, with the result that the grippers are released from a record disc. Fig. 14 shows the positions of the parts when a record disc is grasped by the grippers.

There are provided an inner gripper member 70, and an outer gripper member 71, actuated to grip or release the record disc at the proper times. The construction and operation of grippers per se, such as elements 70 and 71, are well known to those skilled in this art, and are clearly shown in the aforesaid reissue patent to Green, so that further description is deemed unnecessary herein. The inner gripper member 70 engages one edge of a record disc and the outer gripper member 71 has an arm which embraces the periphery of the disc and engages the diametrically opposed edge portion of the disc (Fig. 1).

Relative displacement of gripper members 70 and 71 is accomplished by displacement of the gripper-actuating members 69 and 72. These members are circular in cross section and are rotatably mounted within the transverse bore of barrel 48 defined by its portion 65. The gripper-actuating member 72 has an integral rectangular shank 87 mounted for slidable movement within a complementary square-shaped bore 88 in mushroom 33. Thus, when mushroom 33 rotates about the transverse axis of barrel 48, shank 87 and gripper actuator 72 rotate in synchronism therewith. Actuating member 72 also has an integral connecting rod 75, also formed with a square section, slidably mounted within a complementary square-shaped bore in actuating member 69. Connecting rod 75 is secured to the inner gripper member 70 as indicated at 76 (Fig. 14). Gripper-actuating member 69 is integral with the outer gripper member 71 and is formed with a pair of spring pockets 80. The outer gripper member 70 is also formed with spring pockets 81. Springs 82 are compressed between these pockets and they tend so to displace the gripper members that a record is grasped. That is, the compression of springs 82 supplies the energy which causes a record disc to be gripped. The spreading of the grippers and release of the record disc are accomplished by rotation of cam 68, which spreads apart the gripper-actuating members 69 and 72.

Mushroom 33 has an integral cylindrical portion 84 mounted for rotation within the transverse bore of barrel 48. Portion 84 is formed with an annular groove 85 into which screw 86 slidably fits, whereby axial displacement of the mushroom relative to the barrel is prevented. By reason of the square cross sections of shank 87, connecting rod 75, the internal bore of mushroom 33 and the internal bore of gripper-actuating member 69, the whole gripper assembly 42, comprising members 70, 71, 69, 82, 75, 72, 87 and 33, rotates in unison about the transverse axis of the barrel 48 whenever mushroom 33 is rotated about that axis. Members 72, 87, 75 and 70 move linearly in unison and members 71, 69 always move linearly in unison when a record disc is grasped or released.

The function of elements 47, 64 and 48, acting together, is to impart to a transported record a turning motion relative to the bore axis of bearing 63. The function of the mushroom 33 is to impart to the gripper assembly and transported record a twist or turning motion about the transverse bore axis of the barrel 48. As a result of these two rotations the record disc is transported from the transfer position shown in Fig. 1, successively through the positions illustrated in Figs. 7, 8, 9, 10, 11 and 12 and placed on the turntable so that it can be played. As a result of a similar combination of these two rotations, but in opposite directions, the record is returned from the position illustrated in Fig. 12 to that illustrated in Figs. 1 and 2 at the end of record play, whereby it is again placed in the record magazine. Thus it will be seen that the grippers 70 and 71 are mounted with two degrees of controlled rotational freedom with respect to the transfer head 60.

The system of gearing by which gears 47 and 52 (Fig. 14) are driven is next described. Gear 52 (Fig. 2) is in mesh with a gear 51, mounted for rotation on a shaft 90 (Fig. 3) which shaft is rigidly secured to an integral ear 91 on transfer head 60. Also mounted on shaft 90 is gear 46. A spacing washer 92 is disposed between gears 51 and 46. Linear displacement of gears 51 and 46 is prevented by a screw 93 and a washer 94. Always in mesh with the teeth on gear 51 are the teeth on a sector gear 50. The lower portion of this sector gear projects through an opening 95 (Fig. 3) on base 20 and is pivotally mounted on a shaft 96. This shaft is rigidly mounted by lock nuts 97 and 98 on a depending portion 99 of the transfer head casting 60. Linear displacement of gear 50 relative to shaft 96 is prevented by a screw 100.

Sector gear 50 is formed with a longitudinally extending slot 101 with which pin 44 is fitted for slidable reciprocating motion. At the head of the pin are a washer 103 and a screw 104 (Fig. 3). Pin 44 is rigidly secured to gear 39, whereby the rotary motion of gear 39 and pin 44 causes pin 44 to exert force components transverse to gear 50, with the result that the motion of rotation of gear 39 is converted into oscillatory motion of gear 50 and ultimately into rotation of gear 52.

Rotation of gear 47 is effected in a similar manner. Gear 46, which drives gear 47, is in mesh with a sector gear 45, also pivotally mounted on shaft 96 (Fig. 3). It has been seen that gear 50 is formed with a straight slot 101. On the other hand, gear 45 is formed with a generally elliptical slot 106, with respect to which pin 44 is mounted for considerable play. This slot terminates at each end in straight slot portions 107, 108.

Figs. 1 and 2 show the conditions which prevail when a record has attained the transfer position and before it is grasped by the gripper assembly. As gear 39 begins to turn in a clockwise direction pin 44 rises and turns sector gear 50 clockwise. Accordingly, gear 51 rotates counterclockwise and gear 52 rotates clockwise, turning cam 68 and causing the gripper elements 70 and 71 to clamp the record between them. At this stage barrel 48 and gears 45, 46 and 47 are stationary, because pin 44 is not moving gear 45.

Figure 7:
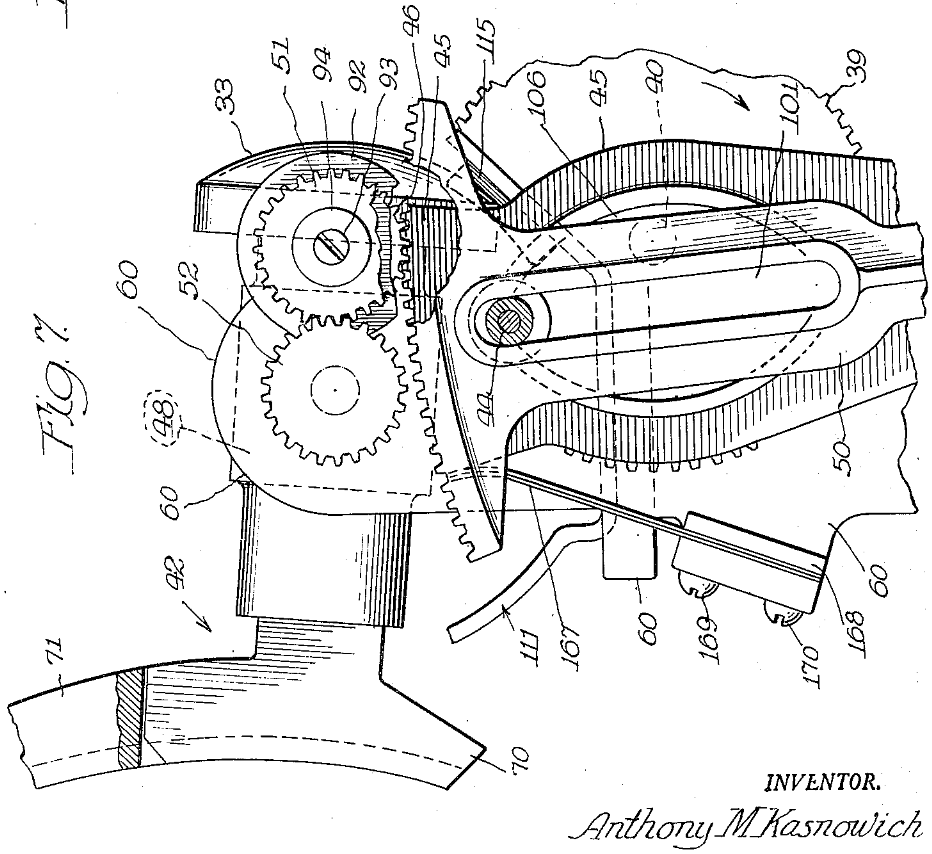

Fig. 7 shows the conditions which exist when the record has been gripped. Pin 44 is still causing gear 50 to rotate clockwise and the pin is now in contact with the straight portion 107 of slot 106, whereby motion is imparted to gear 45. Gears 45 and 50 then turn clockwise in unison and barrel 48 starts to turn. Gears 47 and 52 also rotate in synchronism, whereby cam 68 does not rotate relative to barrel 48. Therefore the record disc remains securely gripped. The parts now progress from the position shown in Fig. 7 to that shown in Fig. 8, barrel 48 being rotated relative to the axis of bearing 63.

Figures 9, 10:
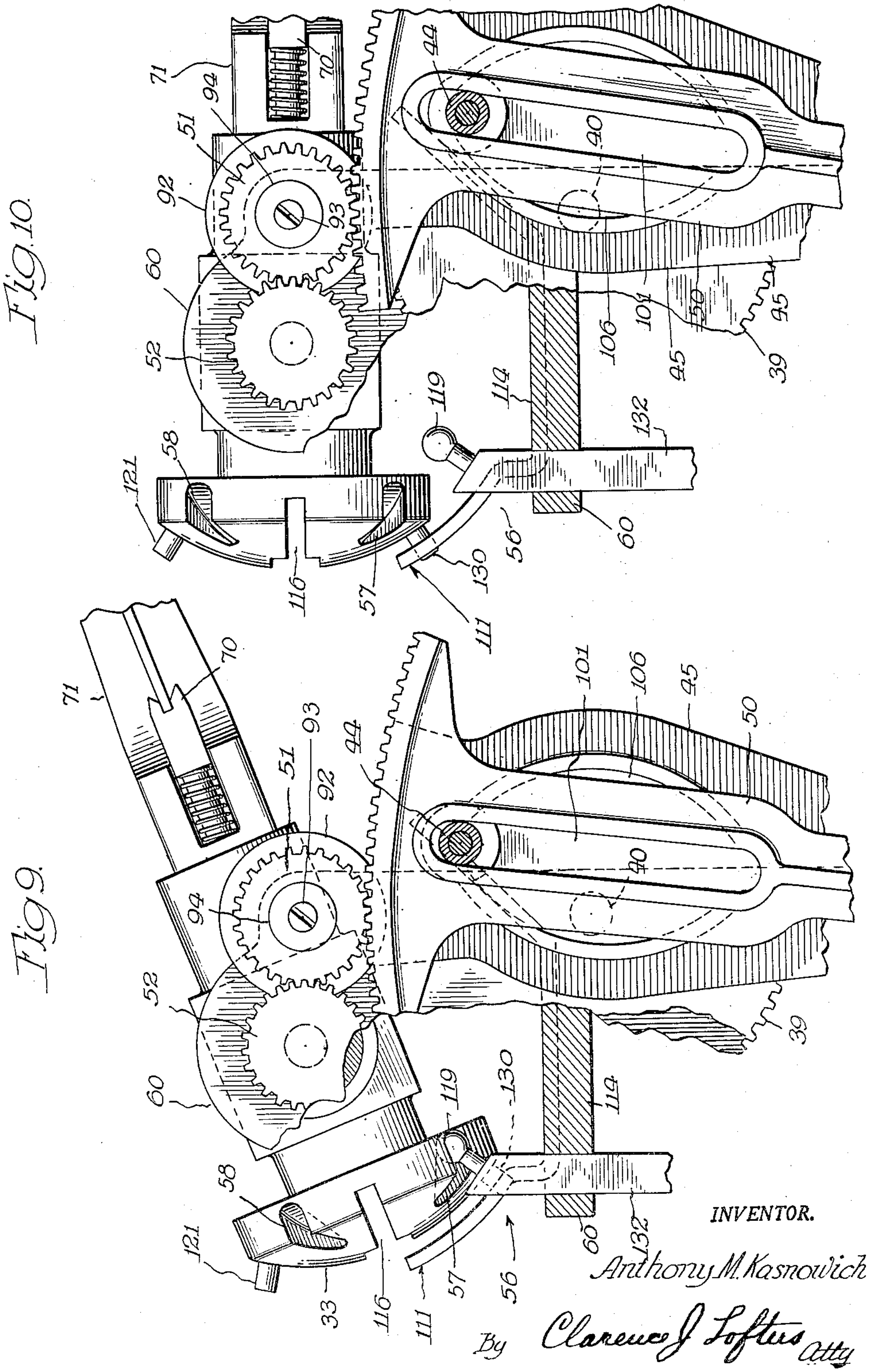

Referring now to Fig. 9, it will be seen that pin 44 is departing from the straight portion 107 of slot 106 and that the record is about to be laid on the turntable in a proper position to be played.

Fig. 10 shows the conditions which exist as the record is laid on the turntable. Pin 44 is again in contact with the elliptical portion of slot 106 so that the motion of gear 45 and therefore of gear 47 ceases. Accordingly, barrel 48 stops. But pin 44 is in close contact with slot 101 on gear 50 so that the motion of that gear continues. By reason of the continued motion of gear 50 the clockwise rotation of gear 52 and cam 68 continues, whereby the record disc is released from the gripper members 70 and 71.

Figures 11, 12:
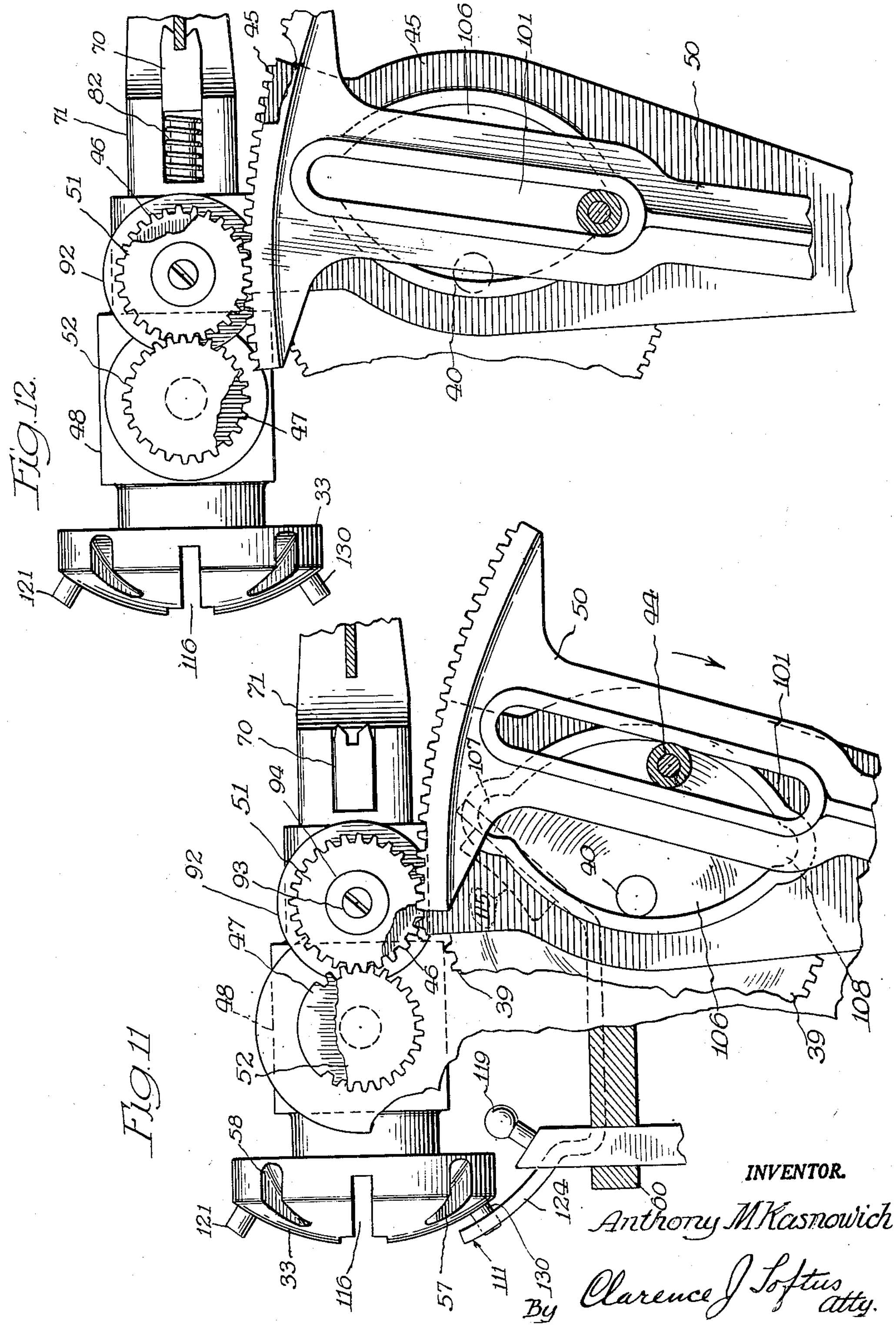

Fig. 11 shows the conditions which exist after the record has been released during record play.

It will be noted that during the portions of the cycle of operations illustrated in Figs. 2, 7, 8, 9, 10 and 11, the forces exerted by pin 44 on the sector gears 45 and 50 have been such as to turn the sector gears toward the right or clockwise as viewed from the front. When the record is to be regripped pin 44 begins to exert forces in the opposite direction with respect to those sector gears, gear 39 always turning clockwise. Initially, pin 44 drops in slot 101 from the position illustrated in Fig. 11 to that shown in Fig. 12, causing sector gear 50 to turn counterclockwise as seen from the front. Accordingly, gear 51 rotates clockwise and gear 52 rotates counterclockwise, whereby cam 68 is rotated counterclockwise and the record disc is regripped (Fig. 14). The gears 45, 46 and 47 and barrel 48 are now stationary since pin 44 is not exerting any force on sector gear 45. As pin 44 continues to progress downwardly with respect to slot 101, it comes into contact with the straight portion 108 of slot 106 and exerts such force on sector gear 45 that the latter starts to turn counterclockwise. Accordingly, gears 46 and 47 then rotate in unison and barrel 48 turns counterclockwise relative to the bore axis of bearing 63. Gears 47 and 52 also rotate in synchronism so that the record disc remains securely gripped. These conditions are illustrated in Fig. 12. When pin 44 is in slot portion 108 its horizontal component of velocity is again a maximum.

Finally pin 44 starts to rise in slot 101 and it departs from slot portion 108 of slot 106, passing to the elliptical portion of the slot, whereby gear 45 stops (see Fig. 13). Accordingly, gears 46 and 47 and barrel 48 stop and remain stationary. As pin 44 rises from the position shown in Fig. 13 to that shown in Fig. 2 it continues to turn gear 50 counterclockwise, whereby gears 51 and 52 so rotate that cam 68 rotates counterclockwise, releasing the record from the grippers 70, 71 to the record magazine. The cycle may then be repeated when it is desired to play another record.

Thus it will be seen that in accordance with the invention I have provided a reliable and sure mechanism for transporting and assuring a firm grip on the record disc during transportation from the magazine to the turntable and again during transportation from the turntable back to the record magazine.

Also in accordance with the invention I provide a novel and improved mechanism 56 for causing mushroom 33 and the gripper assembly 42 to turn relative to the transverse bore axis of barrel 48 during record transportation in such manner as to determine which side of a record disc will be played. Fig. 3 shows the conditions which exist when the rear side of a record disc is to be played, for example. A guide member 111 is secured by screws 112 and 113 (Fig. 3) to a platform portion 114 of transfer head 60. This guide member is generally arcuate in shape (Fig. 4) and it includes an integral upstanding projection 115 which successively slidably guides complementary grooves 116 and 117 (Fig. 3) formed on the face of mushroom 33 as the mushroom progresses from the position shown in Fig. 2, and through the positions shown in Figs. 7 and 8. During record delivery it is the function of projection 115 and grooves 116 and 117 to prevent any rotation of mushroom 33, relative to the transverse bore of barrel 48, until the conditions shown in Fig. 8 have been attained, that is, until the transverse bore of barrel 48 has reached the vertical. After the transfer mechanism attains the conditions illustrated in Fig. 8 and while it is progressing to the conditions illustrated in Fig. 9, that is, while it is passing from the vertical to a diagonal position, one of the ball-shaped plungers 119 or 120 (Fig. 15) enters its corresponding one of grooves 57 and 58, formed on the face of mushroom 33, causing the mushroom to rotate relative to the transverse bore axis of the barrel 48. Let it be assumed, for example, that the rear side of the record is to be played. Under that assumed condition and as the transfer mechanism progresses from the Fig. 8 condition to the Fig. 9 condition ball-plunger 119 enters groove 57 and pushes on side 160 of the groove. As the mushroom continues to turn with and within barrel 48 plunger 119 touches end 161 of groove 57 and then side 162 of the groove. This action causes the mushroom to rotate in a counterclockwise direction (as viewed from the top) through ninety degrees whereby the rear side of the record disc is laid in playing position. As the transfer mechanism progresses through the conditions illustrated in Fig. 9, after this ninety-degree rotation relative to the transverse bore axis of the barrel has been imparted to mushroom 33, and as barrel 48 continues to rotate relative to the bore of bearing 63 groove 57 departs from ball plunger 119 and then integral lug 130 formed on the face of mushroom 33 enters and rides in slot 124 (Fig. 4) formed in the end of guide member 111 opposite to the end on which upstanding lug 115 is formed. The function of lug 130 and slot 124 is to guide the mushroom and to prevent any further turning of the mushroom relative to the transverse bore axis of barrel 48 as the record is finally laid on the turntable.

On the other hand, when the front side of a record is to be played, projection 115 initially successively guides grooves 116 and 117 but ball plunger 120 thereafter enters groove 58 (Fig. 3), imparting a twist to mushroom 33 in the opposite direction, and integral projection 121 formed on mushroom 33 finally enters slot 124 of guide member 111 whereby, after the desired ninety-degree twist is imparted to the record disc, a further twist is prevented as the record finally is laid on the turntable. Projections 130 and 121 are diametrically opposed on the face of the mushroom 33.

During return of the record from the turntable to the record rack the angular position of the mushroom relative to the transverse bore axis of barrel 48 is initially governed by the guided motion of projection 130 (when the rear side of record has been played) or projection 121 (when the front side of the record has been played), thereafter by the twisting effect of ball-plunger 119 and groove 57 (when the rear side of the record has been played) or by ball-plunger 120 and groove 58 (when the front side of the record has been played) and finally by projection 115 successively riding in grooves 117 and 116.

It will be observed that grooves 57 and 58 converge toward a common center point on mushroom 33. This expedient results in smooth action and long wear. It will also be noted that the mushroom and gripper assembly are stabilized against twisting both before and after the ninety-degree turn is imparted to the mushroom and gripper assembly whether during record delivery or record return.

The ball-plungers 119 and 120 (Fig. 3) are secured to rods 132 and 133, respectively, mounted for slidable motion with respect to suitable apertures in platform portions 114 and 164 of transfer head 60 (Fig. 3). Depending from platform portion 114 is an integral ear 134 carrying for rotation on a shaft 135 a cross-arm 136 (Fig. 3). The ball-shaped end portions 137 and 138 of cross-arm 136 are universally mounted in sockets 139 and 140 formed in rods 132 and 133, respectively. Rigidly secured to rod 133 is a block 142 which carries for rotation a shaft 143. When shaft 143 is displaced upwardly (Fig. 3) ball portion 138 of cross arm 136 is also displaced upwardly, whereby plunger 120 is placed in proximity to groove 58 and in such a position as to cause the front side of a record disc to be placed in playing position. Ball end portion 137 of cross-arm 136 then moves downwardly, also pushing rod 132 downwardly and retracting ball-plunger 119 from the locus of groove 57. Conversely, when shaft 143 and block 142 are displaced downwardly ball-plunger 120 is retracted from the locus of groove 58 and ball-plunger 119 is advanced toward the locus of groove 57, whereby the rear side of a record disc is played. Shaft 143 is so controlled by the record magazine that block 142 is in its "down" position whenever the last motion of the record magazine before the record attains transfer position is toward the rear. Similarly, when that last motion of the record magazine is toward the front the block 142 is in its "up" position. The mechanism whereby the record magazine controls shaft 143 in this manner is fully disclosed and described in the above-mentioned reissue patent and in my first-mentioned co-pending application, so that further description herein is deemed unnecessary.

For the purpose of providing a stop against which an edge of sector gear 45 abuts during the conditions illustrated in Fig. 2 a strong leaf spring 167 is mounted on portion 168 of the transfer head 60 by screws 169 and 170.

It will be seen that in accordance with this invention there are provided a novel scheme for guiding the mushroom at both the beginning and the end of the rotation of barrel 48 relative to the bore axis of bearing 63 and an improved and long wearing and smooth mechanism for imparting to the mushroom 33 and the gripper assembly 42 a ninety-degree twist relative to the transverse bore axis of barrel 48 in the interim. Also there is provided a positive, sure and reliable mechanism for controlling the positions of the ball-plungers 119 and 120. Additionally, the invention provides the flat cam 68 for spreading the gripper actuating members 69 and 72 and a simple, positive and sure mechanism including the sector gears 45 and 50 for obtaining the required timing in the action of gears 47 and 52, whereby the record disc is gripped before transportation, maintained securely gripped during transportation, and then released at the end of transportation.

While there has been shown and described what is at present considered to be the preferred embodiment of the present invention, it will be obvious to those skilled in the art, especially to those who have the benefit of my contribution thereto, that various modifications and substitutes of equivalents may be made herein without departing from the spirit of the invention and it is, accordingly, intended in the appended claims to cover all such changes and modifications as fall within the true and proper scope of the invention and without the scope of the prior art.

Having thus described my invention, I claim:

1. In an automatic record changer of the type including a transfer barrel rotatably mounted between a magazine and a turntable, a first pinion gear for rotating said barrel, whereby to transport a record disc between magazine and turntable, means carried by said barrel and including a second pinion gear rotatable relative to said first gear to grasp and release records, a mechanism for initially rotating said second pinion gear relative to said first pinion gear and thereafter to drive said pinion gears in synchronism and finally to rotate said second pinion gear relative to said first pinion gear, whereby a record disc is grasped before said transfer barrel is rotated and maintained securely grasped during rotation of said barrel and released when the rotation of said barrel is completed, comprising a first pivotally mounted sector gear formed with a slot having an enlarged elliptical central portion and straight terminal portions for actuating said first gear, a second pivotally mounted sector gear formed with a straight slot for actuating said second pinion gear, the terminal portions of said first-mentioned slot coinciding with the ends of said straight slot, and means including a pin mounted for circular motion and projecting through said slots for driving said sector gears, said pin closely fitting said straight slot and said straight-slot terminal portions, said pin and slots being so arranged that the last-mentioned means initially and finally drives said first sector gear and said first pinion gear alone as said pin moves with a component transverse to said straight slot and that said pin intermediately drives both of said sector gears and both of said pinion gears as said pin moves with a component transverse to said straight-slot terminal portions of said second sector gear.

2. In an automatic record changer, the combination in accordance with claim 1, a third pinion gear intermeshing with said first pinion gear and said first sector gear, and a fourth pinion gear intermeshing with said second pinion gear and said second sector gear.

3. In an automatic record player a turntable, a record magazine, a fixed transfer head support interposed between the turntable and record magazine, a transfer housing rotatably mounted in said support, said housing including record gripping and releasing means, a driven crank means mounted for rotation in said support, gear means for intermittently oscillating said housing about an axis including a quadrant gear pivotally mounted to said support and having a cam surface therein, a gear driven shaft axially positioned in said housing including rotatable means at its inner end for operating said gripping and releasing means, a second quadrant gear pivotally mounted on said support in engagement with said gear driven shaft and having a slot therein, said crank means in engagement with the said cam surface and the said slot in said quadrant gears whereby uni-directional rotation of said crank means will intermittently and independently oscillate both said quadrant gears to grip and transfer a record from said magazine to said turnatable and release it thereon when said crank means is rotated.

4. In a record changer of the type including a fixed transfer support interposed between a record magazine and a turntable, a transfer housing rotatably mounted on said support for transferring record discs from the magazine to the turntable, said housing being provided with means at one end for grasping record discs and with means at the other end comprising a rotatable record-turning member arranged transversely to the axis of rotation of said housing and swinging therewith, said turning member having a plurality of converging grooves therein, a pair of selectively operable plungers, and means for controlling said plungers, whereby one or the other thereof slidably engages one of said grooves and rotates said record-turning member, said plungers being operative to rotate said turning member in opposite directions, wherein said turning member is formed with a transverse straight groove between said converging grooves and a pair of spaced projections, guide means projecting into said groove for guiding said turning member and preventing rotation thereof before said one of said plungers rotates said turning member, and guide means slidably receiving one of said projections for preventing rotation of said turning member after said one of said plungers rotates said turning member.

ANTHONY M. KASNOWICH.

REFERENCES CITED

The following references are of record in the file of this patent:

UNITED STATES PATENTS

| Number | Name | Date |
|---|---|---|
| Re. 21,514 | Green | July 23, 1940 |
| 1,312,250 | Holmboe | Aug. 5, 1919 |
| 2,003,424 | Brandstrom | June 4, 1935 |
| 2,205,268 | Mitchell | June 18, 1940 |